Patented May 4, 1937

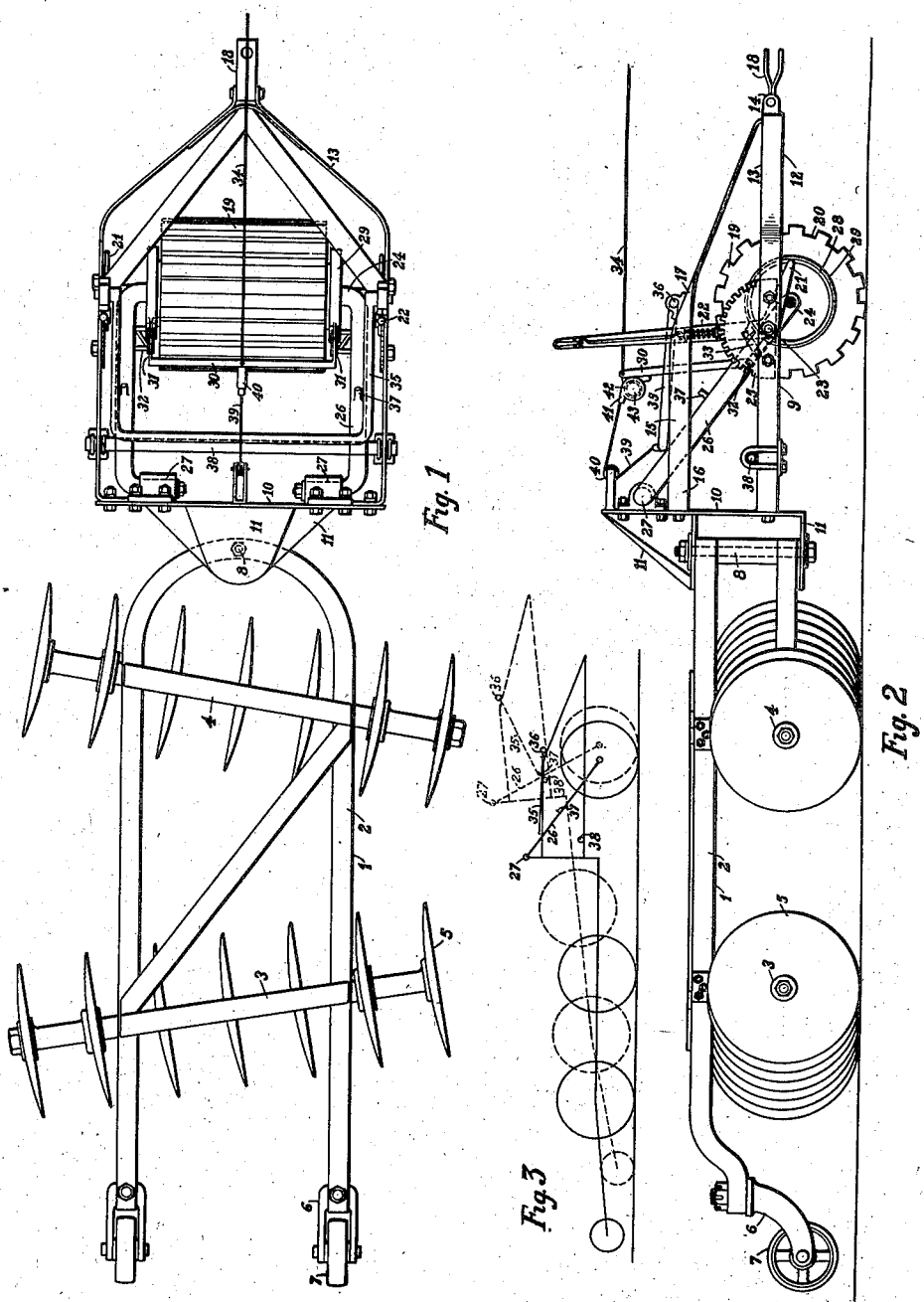

2,079,249

UNITED STATES PATENT OFFICE 2,079,249

FARM IMPLEMENT

Salvatore Galati, Modesto, and Sandy S. Sorrenti, Escalon, Calif.

Application June 18, 1936, Serial No. 85,900

12 Claims. (Cl. 97—73)

The present invention relates to improvements in farm implements and its principal object is to provide lifting means for a plow or other earth moving implement for lifting the latter out of engagement with the soil on turns or whenever desired.

More particularly our invention has reference to a tractor-operated gang plow, particularly the conventional type known as the disc plow and its object is to provide means permitting the operator of the tractor to lift the plow out of the ground without leaving his seat on the tractor.

It is further proposed to arrange the lifting means in such a manner that the lifting may be effected by a slight pull on a rope, the forward movement of the tractor being relied on to furnish the power for lifting the plow.

It is further proposed to arrange the lifting means in such a manner that the plow automatically remains in lifted position until it is released from said position by a further operation on the part of the operator seated on the tractor.

It is further proposed to arrange the lifting means in such a manner that it may be released by a pull on the same rope and by the same manipulating means.

It is further proposed, to provide in combination with the lifting means a depth regulator for the plow whereby the latter may be made to cut a furrow of a desired size.

Further objects and advantages of our invention will appear as the specification proceeds.

The preferred form of our invention is illustrated in the accompanying drawing, in which—

Figure 1 shows a top plan view of a disc plow having our lifting means attached thereto, Figure 2 a side elevation of the same, and Figure 3 a diagrammatic view illustrating the movement of the various parts of our invention.

While we have shown only the preferred form of our invention we wish to have it understood that various changes or modifications may be made within the scope of the claims hereto attached without departing from the spirit of the invention.

Referring to the drawing in detail, the plow or other ground moving implement I may be of any conventional or preferred type and is here shown as a disc plow comprising a frame 2 supported over two shafts 3 and 4 carrying the conventional discs 5, the shafts being usually arranged at an angle to one another as shown in the drawing to work on the soil in opposite direction. The frame which normally occupies a horizontal position carries, by means of brackets 6, a pair of wheels or casters 7 at the rear end, the casters being normally arranged at an elevation above the bottom edges of the discs as shown at Figure 2.

The front end of the frame I is connected, by means of a hinge pin 8 to a second frame 9 which is interposed between the plow and the traction means, such as a tractor or any other draft means, not shown in the drawing. The frame 9 comprises in substance a vertical rear plate 10 having rearwardly extending brackets 11 by means of which it is connected to the hinge pin 8 and a forwardly extending frame structure including a lower section 12 comprising two parallel side bars 13 converging toward the center line in front as at 14, and an upper section 15 which also consists of two parallel bars 16 arranged above the bars 13 and twisted as at 17 to bend downward and inwardly so as to meet at the center line where they are suitably joined to the front end of the lower section. This front end is provided with suitable means, as the link 18, for coupling the same to the draft means, such as a tractor, the coupling being such as to allow of vertical movement of the frame while the tractor advances.

Inside of the lower frame section we provide a drum or wheel 19 which rolls on the earth surface and preferably has a grooved peripheral surface 20 for securing a firm hold thereon. It is disconnected from the lower frame section but serves as a draft adjusting means for the plow insofar as it supports the frame through the lower arms 21 of the levers 22 pivoted to the two side bars 13 as at 23, the arms 21 resting on extensions of the axle 24 of the wheel.

The position of the lever can be adjusted by the conventional quadrant arrangement shown in the drawing including a toothed sector 25 attached to each side bar 13 and a manually operated, spring-pressed pin engageable with the teeth for holding the lever in any desired adjusted position relative to the sector.

It will be noted that this arrangement does not prevent the frame from being lifted away from the axle of the wheel but it only limits the downward movement of the frame relative to the wheel axle depending upon the angular position of the lever arm 21 and the position of the wheel longitudinally of the frame.

The latter position is determined by the two arms 26 which project radially from the axle of the wheel and are secured, at their extremities, to the rear plate 10 of the frame with freedom of pivotal motion as at 27. These arms, it will be noted, are normally arranged in an inclined direction and they serve as the driving means for the wheel 19, motion being transmitted from the traction means to the frame and from the frame to the wheel through the arms 26.

The wheel 19 has a pair of brake drums 28 arranged on opposite sides thereof and a brake band 29 for each drum. The brake bands are of conventional construction and are secured to the arms 26 respectively. They are actuated by means of a lever 30 which is arranged centrally of the frame and spreads, at its lower end, in two arms 31 straddling the wheel and pivoted on pins 32, the short end of the lever operating the brake mechanism through links 33 in a manner well known in the art. The long arm of the lever is operated by means of a rope 34 which may be readily actuated by the driver seated on the tractor.

It is apparent from this arrangement that when the tractor and the plow are advancing and the driver of the tractor pulls on the rope 34 the brake is set and the arms 26 carrying the brakes thereby become fixed relative to the wheel with a tendency to arrest the rotation of the wheel. The forward draft on the frame, however, continues with the result that the arms 26 swing about the axle of the wheel and lift the entire frame which pivots on the arm extremities 27. During the movement the frame changes its position relative to the arms 26 in such a manner that a yoke 35 pivoted in the upper frame section as at 36 runs downward along the upper faces of the arms 26 until it strikes the stops 37 at which time the yoke occupies a position almost but not quite perpendicular to the arms 26. The arms 26 are prevented from swinging beyond this position by a cross-member 38 which stretches across the lower frame section underneath the arms 26 and which strikes the arms 26 during the forward motion of the frame.

At the end of the forward movement as shown in Figure 3, the swinging arms are locked in position by the yoke 35 which makes an angle therewith of slightly less than 90 degrees, while the cross-member 38, which may have struck the arms 26 from below has fallen back from the arms slightly so as to leave a little clearance between the arms and the cross-member. With the brake released, the forward movement may be continued and the frame, with the plow attached thereto, will be maintained in its elevated position so that the discs of the plow blades more or less clear the ground surface and thereby facilitate maneuvering for turning around.

The rear end of the yoke 35 is connected to a rope 39 which is guided over a sheave 40 into a housing 41 secured to the upper end of the lever 30. In the housing the rope is wound upon a drum 42 which is actuated by a spring 43 to maintain the rope taut but which allows the rope to feed out of the housing, under the weight of the yoke 35 until the latter reaches the stops 37.

This rope is used for the purpose of releasing the frame from its elevated position. To effect such release the driver seated on the tractor jerks on the rope 34, with a two-fold effect. In the first place he momentarily resets the brake and thereby initiates a further momentary forward movement of the frame relative to the arms 26, which is made possible by the slight clearance left between the arms 26 and the cross-member 38 and which relieves any binding action between the yoke and the arms 26. In the second place he exerts an upward pull on the yoke through the rope 39 which upward pull is aided by the fact that the yoke was not quite perpendicular to the arms 26 and as a result of these two effects the yoke 35 rides upward along the arms 26 and allows the whole machine to fall back into its original position.

Thus the operator has complete control over the lifting and the dropping of the disc plow or other implement to which the invention may be applied by operation of a single rope and without leaving the driver's seat.

As the frame is lifted the plow assumes a slanting position and the weight of the plow is made to rest on the casters 7 at the rear end and on the wheel 19 at the front end.

It will be noted that the drawing shows a disc plow or cultivator in which the blades or discs are fixed at a definite angle. In conventional practice the discs are mounted with freedom of adjustment of their angularity for regulating the depth of cut. Where our front wheel is used, with the adjustable means for supporting the front of the implement thereon, it is unnecessary to provide for adjustment of the discs and we preferably omit the adjustable feature, setting the discs at a maximum angle for maximum cut and relying on the front wheel to secure the actual depth of cut desired. This is all the more feasible since for transportation purposes the discs may be lifted off the ground entirely by the power lift so that their angularity does not interfere with the transporting operation.

We claim:

1. In combination, a ground moving implement having a rear wheel normally disposed above the ground, a front ground-engaging wheel, and a power lift for lifting the implement relative to the front wheel, whereby the rear wheel is made to become the rear support for the implement.

2. In combination, a ground-moving implement having a rear wheel normally disposed above the ground, a front ground-engaging wheel, adjustable means for supporting the implement on the front wheel for regulating the working depth of the implement in the ground, and a power lift for lifting the implement relative to the front wheel, whereby the rear wheel is made to become the rear support for the implement.

3. In combination, a ground-moving implement having a supporting frame and a pair of spaced rear wheels rotatably mounted in the frame and held against vertical movement with respect to the frame, the rear wheels being normally disposed above the ground, a front ground-engaging wheel, and a power lift for lifting the implement relative to the front wheel, whereby the rear wheels are made to become the rear support for the implement.

4. A power lift for a ground-moving implement, comprising a frame securable to the implement, a traction wheel having an axle, arms projecting rearwardly from the axle in inclined relation to the ground surface and being swingably secured at their upper ends to the frame, means for locking the traction wheel and the arms together to effect the swinging of the arms to lift the frame by draft power imparted to the frame, and a swingably mounted yoke having a section made to ride along the arms and cooperating therewith for holding the frame in raised position.

5. A power lift for a ground-moving implement, comprising a frame securable to the implement, a traction wheel having an axle, arms projecting rearwardly from the axle in inclined relation to the ground surface and being swingably secured at their upper ends to the frame, means for locking the traction wheel and the arms together to effect the swinging of the arms to lift the frame by draft power imparted to the frame, and a swingably mounted yoke having a section made to ride along the arms and cooperating therewith for holding the frame in raised position, and means operable from a position removed from the power lift for releasing the yoke from the arms to lower the frame.

6. A power lift for a ground-moving implement, comprising a frame securable to the implement, a traction wheel having an axle, arms projecting rearwardly from the axle in inclined relation to the ground surface and being swingably secured at their upper ends to the frame, means for locking the traction wheel and the arms together to effect the swinging of the arms to lift the frame by draft power imparted to the frame, a swingably-mounted yoke movable into angular relation with respect to the arms and having a section made to ride along the arms and cooperate therewith for holding the frame in raised position, and means for limiting the movement of the yoke along the arms when the yoke is disposed at slightly less than normal to the arms.

7. A power lift for a ground-moving implement, comprising a frame securable to the implement, a traction wheel having an axle, arms projecting rearwardly from the axle in inclined relation to the ground surface and being swingably secured at their upper ends to the frame, means for locking the traction wheel and the arms together to effect the swinging of the arms to lift the frame by draft power imparted to the frame, and a swingably mounted yoke having a section made to ride along the arms and cooperating therewith for holding the frame in raised position and means for limiting the swinging movement of the arms.

8. A power lift for a ground-moving implement, comprising a frame securable to the implement, a traction wheel having an axle, arms projecting rearwardly from the axle in inclined relation to the ground surface and being swingably secured at their upper ends to the frame, means for locking the traction wheel and the arms together to effect the swinging of the arms to lift the frame by draft power imparted to the frame, and a swingably mounted yoke having a section made to ride along the arms and cooperating therewith for holding the frame in raised position, and common means for actuating the locking means between the wheel and the arms during one operation and for releasing the yoke from the arms during the next operation.

9. A power lift for a ground-moving implement comprising a frame securable to the implement, a traction wheel having an axle, arms projecting rearwardly from the axle in inclined relation to the ground surface and being swingably secured at their upper ends to the frame, braking means for locking the traction wheel and the arms together to effect the swinging of the arms to lift the frame by draft power imparted to the frame, the braking means including an operating lever, a swingably mounted yoke having a section made to ride along the arms and cooperating therewith for holding the frame in raised position, and a yielding connection between the operating lever and the yoke to release the yoke from the arms when the lever is operated.

10. A power lift for a ground-moving implement, comprising a frame securable to the implement, a traction wheel having a grooved periphery to grip the ground and having an axle, arms projecting rearwardly from the axle in inclined relation to the ground surface and being swingably secured at their upper ends to the frame, means for locking the traction wheel and the arms together to effect the swinging of the arms to lift the frame by draft power imparted to the frame, and a swingably mounted yoke having a section made to ride along the arms and cooperating therewith for holding the frame in raised position.

11. In a power lift, a frame, arms swingably secured thereto having a traction wheel mounted thereon, braking means for locking the wheel to the arms and including an operating lever, a yoke for holding the arms against return movement when the arms are moved in one direction, and a spring actuated drum carried by the lever and having a flexible member wound thereon and connected to the yoke to release the yoke when the lever is actuated.

12. A power lift for lifting a ground-moving implement, comprising a frame, including rearwardly extending brackets, means for securing the brackets to the implement with horizontal swinging movement therebetween, a traction wheel for supporting the frame, means for lifting the frame relative to the wheel, and means for holding the frame in raised position.

SALVATORE GALATI.
SANDY S. SORRENTI.